(12) United States Patent
Iwata et al.

(10) Patent No.: US 6,644,870 B2
(45) Date of Patent: Nov. 11, 2003

(54) OPTICAL FIBER TRANSMISSION LINE

(75) Inventors: Noriko Iwata, Yokohama (JP);
Takatoshi Kato, Yokohama (JP);
Keiichiro Fukuda, Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 46 days.

(21) Appl. No.: 10/103,134

(22) Filed: Mar. 22, 2002

(65) Prior Publication Data

US 2002/0146221 A1 Oct. 10, 2002

(30) Foreign Application Priority Data

Mar. 22, 2001 (JP) ............................. 2001-083120

(51) Int. Cl.$^7$ ................................. G02B 6/255
(52) U.S. Cl. .................. 385/96; 385/28; 65/501
(58) Field of Search .................. 385/96, 95, 98, 385/135, 97, 99, 28; 65/407, 378, 484, 501

(56) References Cited

U.S. PATENT DOCUMENTS 5,933,561 A    8/1999  Sugizaki ................. 385/123

6,275,627 B1 * 8/2001  Wu ......................... 385/28

FOREIGN PATENT DOCUMENTS

| JP | 08-190030 | 7/1996 |
|----|-----------|--------|
| JP | 2618500   | 3/1997 |
| JP | 10-206659 | 8/1998 |
| JP | 10-300970 | 11/1998 |
| JP | 11-6934   | 1/1999 |
| JP | 11-308170 | 11/1999 |
| JP | 2000-91991 | 3/2000 |

* cited by examiner

Primary Examiner—Phan T. H. Palmer
(74) Attorney, Agent, or Firm—McDermott, Will & Emery (57) ABSTRACT

The present invention relates to an optical fiber transmission line having a structure offering superior connection loss characteristics at the fusion-spliced position between optical fibers. This optical fiber transmission line has at least first and second optical fibers that are fusion-spliced. Each of these first and second optical fibers has a core region doped with 10 mol % or more of Ge and has a mode field diameter with a minimum value of 7 $\mu$m or less at the wavelength of 1550 nm. The difference between the minimum mode diameter of the first optical fiber and that of the second optical fiber is 1 $\mu$m or less.

7 Claims, 9 Drawing Sheets

|  | Ge-CONCENTRATION (mol%) | MFD ($\mu$m) AT 1550nm |
|---|---|---|
| OPTICAL FIBER A | 26 | 4.5 |
| OPTICAL FIBER B | 27 | 4.7 |
| OPTICAL FIBER C | 16 | 4.5 |
| OPTICAL FIBER D | 3 | 9.5 |

|  | MFD (μm) AT1550nm | CHROMATIC DISPERSION (ps/nm/km) AT1550nm | DISPERSION SLOPE (ps/nm²/km) AT1550nm | Ge-CONCENTRATION (mol%) |
|---|---|---|---|---|
| FIRST OPTICAL FIBER | 4.47 | -129 | -0.36 | 27 |
| SECOND OPTICAL FIBER | 4.48 | -117 | -0.23 | |

|  | MFD (μm) AT 1550nm | CHROMATIC DISPERSION (ps/nm/km) AT 1550nm | DISPERSION SLOPE (ps/nm²/km) AT 1550nm | Ge-CONCENTRATION (mol%) |
|---|---|---|---|---|
| FIRST OPTICAL FIBER | 4.35 | -144 | -1.36 | 26 |
| SECOND OPTICAL FIBER | 4.41 | -157 | -1.90 | |

|  | MFD (μm) AT 1550nm | CHROMATIC DISPERSION (ps/nm/km) AT 1550nm | DISPERSION SLOPE (ps/nm²/km) AT 1550nm | Ge-CONCENTRATION (mol%) |
|---|---|---|---|---|
| FIRST OPTICAL FIBER | 5.01 | -55 | -0.05 | 16 |
| SECOND OPTICAL FIBER | 5.09 | -52 | -0.06 | |

OPTICAL FIBER TRANSMISSION LINE

BACKGROUND OF THE INVENTION

1. Field of the Invention

This invention relates to an optical fiber transmission line comprising at least two optical fibers fusion-spliced to each other.

2. Related Background Art

A WDM (Wavelength Division Multiplexing) optical communication system enables long-haul transmission of large amounts of data through propagation of signals for multiple channels of multiplexed wavelengths. In order to enable transmission of large amounts of data over long haul, it is preferred that the optical fiber transmission line, which comprises a transmission medium, have a small absolute value for the accumulated chromatic dispersion in a signal wavelength band. However, in an optical fiber transmission line comprising only a single type of optical fiber, it is difficult to obtain a small absolute value for the accumulated chromatic dispersion in the signal wavelength band. Accordingly, an optical fiber transmission line formed by interconnecting two types of optical fiber having different chromatic dispersion characteristics is generally used.

Specifically, such optical fiber transmission line is formed by connecting a standard single-mode optical fiber having a positive chromatic dispersion and a positive dispersion slope in the signal wavelength band (such as a wavelength band of 1.55 $\mu$m) to a dispersion compensator that compensates for the chromatic dispersion in this single-mode optical fiber. This construction results in a small absolute value for the accumulated chromatic dispersion in the entire optical fiber transmission line that includes the single-mode optical fiber and the dispersion compensator. For the dispersion compensator, dispersion compensating optical fiber that has a negative chromatic dispersion and a negative dispersion slope in the signal wavelength band may be used. For example, the dispersion compensator, disclosed in Japanese Patent Application Laid-Open No. 2000-91991, comprises an optical fiber transmission line formed by interconnecting two or more types of dispersion compensating optical fibers in accordance with a predetermined length ratio. Using this dispersion compensator, the absolute value of the accumulated chromatic dispersion over a wide signal wavelength band may be reduced in the entire optical fiber transmission line by compensating for not only chromatic dispersion, but for the dispersion slope as well.

When interconnecting optical fibers having different mode field diameters, such as when connecting single-mode optical fiber with dispersion compensating optical fiber or when connecting two different types of dispersion compensating optical fiber, fusion splicing technology, in which the end surfaces are fusion-spliced after being heated, is generally employed. For example, in the fusion-splicing technology disclosed in Japanese Patent Application Laid-Open No. H3-130705, a first optical fiber having a large core diameter and a small relative refractive index difference of the core with respect to the cladding is fusion-spliced (this process shall hereinafter be referred to as the 'fusion-splicing' process) with a second optical fiber having a small core diameter and a large relative refractive index difference between the core and the clad, the area near the fusion-spliced position is heated, and the dopants in each fiber are diffused (hereinafter referred to as the 'dopant diffusion process'). In this way, the difference between the mode field diameter of the first optical fiber and that of the second optical fiber at the fusion-spliced position is kept small, and the connection loss between the first and second optical fibers is reduced.

Therefore, where a single-mode optical fiber (corresponding to the first optical fiber) and a dispersion compensating optical fiber (corresponding to the second optical fiber) are fusion-spliced, the connection loss can be reduced by performing the dopant diffusion process after fusion-splicing. Where the difference between the respective mode field diameters before fusion-splicing (hereinafter the 'minimum mode field diameter') of the first and second optical fibers is relatively large, this process is performed with the intention of reducing the difference between the respective mode field diameters of the first and second optical fibers at the fusion-spliced position. On the other hand, where the difference between the respective minimum mode field diameters of the first and second optical fibers is relatively small, the dopant diffusion process is not performed.

SUMMARY OF THE INVENTION

As a result of studying the conventional optical fiber transmission line, the inventors have discovered the matters described below.

During the manufacturing process for the conventional optical fiber transmission line, if the difference between the respective minimum mode field diameters of optical fibers are relatively small, as when dispersion compensating optical fibers are fusion-spliced, the dopant diffusion process is not carried out after fusion-splicing. However, the inventors have discovered that, even where the difference between the respective minimum mode field diameters of the optical fibers to be fusion-spliced to each other is relatively small, if the Ge-concentration in the core region of each fiber is large, and the minimum mode field diameter of each optical fiber is small, the connection loss is large when the first and second optical fibers have been fusion-spliced, and this connection loss has a wavelength-dependency. An optical fiber transmission line having these connection loss characteristics is not desirable for long-haul WDM transmission.

In order to overcome these problems, it is an object of the invention to provide an optical fiber transmission line comprising optical fibers fusion-spliced to each other wherein the difference between the respective minimum mode field diameters of the fibers is small and each fiber has a small mode field diameter and a core region doped with a high concentration of Ge, and wherein the optical fiber transmission line has superior connection loss characteristics.

In this specification, 'optical fiber transmission line' refers to a transmission line comprising first and second optical fibers fusion-spliced to each other and have a mode field diameter difference of 1 $\mu$m or less, and includes not only the case in which both the first and second optical fibers are laid in a relay space, but also the case in which the fibers are located in a relay station or the like while one or both of them are wound in a coil configuration and modularized.

The optical fiber according to the present invention comprises a first optical fiber and a second optical fiber fusion-spliced to each other. The first optical fiber has a core region doped with a high concentration (10 mol % or more) of Ge, and a small mode field diameter in which the minimum value at a wavelength of 1550 nm is 7 $\mu$m or less. The second optical fiber as well has a core region doped with a high concentration (10 mol % or more) of Ge, and a small mode field diameter in which the minimum value at the wavelength of 1550 nm is 7 $\mu$m or less. Accordingly, the difference between the respective minimum mode field diameters of the first and second optical fibers is 1 μm or less.

In particular, in this optical fiber transmission line, the mode field diameter of the first optical fiber, at a position separated by at least 2 mm from the fusion-spliced position between the first and second optical fibers, is enlarged so as to reach a value of 110% of the minimum mode field diameter of the first optical fiber. Similarly, the mode field diameter of the second optical fiber, at a position separated by at least 2 mm from the fusion-spliced position between the first and second optical fibers, is enlarged so as to reach a value of 110% of the minimum mode field diameter of the second optical fiber.

As described above, a conventional optical fiber transmission line, which is formed by fusion-splicing first and second optical fibers having a small difference between their respective mode field diameters, has a large connection loss, and this connection loss is highly wavelength-dependent. However, because in the optical fiber transmission line according to the present invention, the respective mode field diameters of the fibers are intentionally enlarged in the respective range of each fiber up to 2 mm from the fusion-spliced position between the first and second optical fibers, both the connection loss and the wavelength-dependency regarding the connection loss are reduced. It is preferred that the enlarged amount of mode field diameter in each of the first and second optical fibers at the fusion-spliced position therebetween be 0.5 μm or more. In this case, the connection loss and the wavelength-dependency thereof are further reduced. It is furthermore preferred, in this optical fiber transmission line, that the end portions of the first and second optical fibers up to 2 mm from the fusion-spliced position therebetween be heated by using a heat source such as a micro-torch or a heater after fusion-splicing the first and second optical fibers, such that the mode field diameters of the first and second optical fibers will be enlarged.

The mode field diameter referred to in this specification means as the Peterman II mode field diameter at the wavelength of 1550 nm. The minimum mode field diameter corresponds to the Peterman II mode field diameter of the optical fiber before fusion-splicing, and substantially corresponds to the Peterman II mode field diameter in the region other than the region in which the mode field diameter is enlarged after fusion-splicing (i.e., the mode field diameter of which no fluctuation occurs before or after dopant diffusion processing). Furthermore, the rate of enlarge in the mode field diameter at a position at least 2 mm from the fusion-spliced position between the first and second optical fibers (i.e., the fusion-spliced end surface of each optical fiber) is set to be 110% or more of the minimum mode field diameter of each optical fiber. Because the mode field diameters at every parts of the optical fiber do not necessarily match, and there is a certain degree of variation when the optical fiber is manufactured, this setting is performed in order to enable the region in which the mode field diameter fluctuates naturally due to this variation during manufacturing to be distinguished from the region in which the mode field diameter is enlarged intentionally.

In the optical fiber transmission line according to the present invention, each of the first and second optical fibers comprises a core region extending along a predetermined axis and having a first refractive index, a first cladding region provided on the outer periphery of the core region and having a second refractive index lower than the first refractive index, and a second cladding region provided on the outer periphery of the first cladding region and having a third refractive index higher than the second refractive index.

Furthermore, in the optical fiber transmission line, it is preferred that each of the first and second optical fibers comprises a core region extending along a predetermined axis and having a first refractive index, a first cladding region provided on the outer periphery of the core region and having a second refractive index lower than the first refractive index, a second cladding region provided on the outer periphery of the first cladding region and having a third refractive index higher than the second refractive index, and a third cladding region provided on the outer periphery of the second cladding region and having a fourth refractive index lower than the third refractive index. Where the first and second optical fibers have the structure described above, an optical fiber transmission line in which the mode field diameters are not enlarged near the fusion-spliced position, as in the conventional art, has a markedly high connection loss, but in this optical fiber transmission line, both the connection loss and the wavelength-dependency regarding the connection loss are reduced.

It is preferred that each of the first and second optical fibers has, as characteristics at the wavelength of 1550 nm, a chromatic dispersion of −200 ps/nm/km to −80 ps/nm/km and a negative dispersion slope. This type of optical fiber is appropriate as a dispersion compensating optical fiber placed in a relay space. It is even more preferred that each of the first and second optical fibers have, as characteristics at the wavelength of 1550 nm, a chromatic dispersion of −60 ps/nm/km to −5 ps/nm/km and a negative dispersion slope. This type of optical fiber is appropriate as a dispersion compensating optical fiber placed in a relay space after it is modularized by being wound in a coil configuration. In either case, the optical fiber transmission line according to the present invention offers reduced connection loss and reduced wavelength-dependency regarding this connection loss.

The present invention will become more fully understood from the detailed description given hereinbelow and the accompanying views which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE EMBODIMENTS

The embodiments of the optical fiber transmission line according to the present invention will now be explained in detail with reference to FIGS. 1A–4B, 5–15, 16A and 16B. In the explanations of the drawings, the same components are assigned the same symbols, and repetitive explanations will be omitted.

Figure 1A:
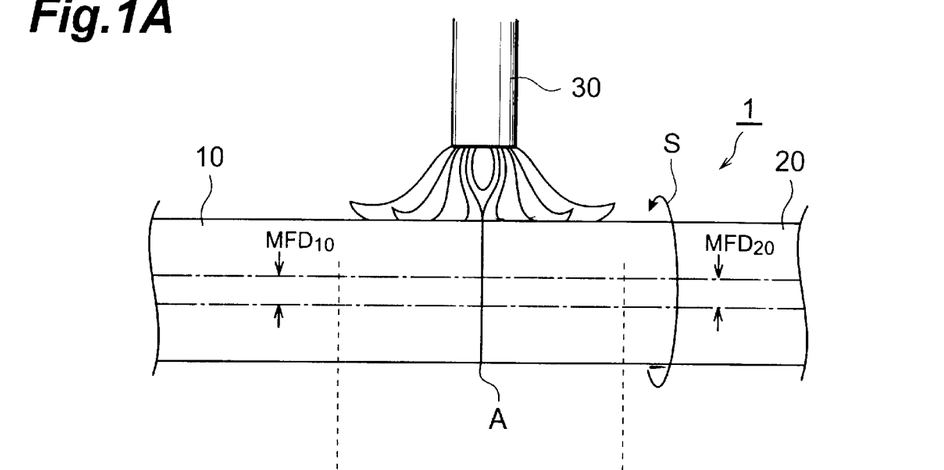
FIG. 1A is a view showing a part of the manufacturing process (the dopant diffusion process near the fusion-spliced position A) for the optical fiber transmission line according to the present invention.

First, the construction of the optical fiber transmission line 1 according to the present invention will be explained. FIG. 1A is a view showing a part of the manufacturing process (the dopant diffusion process near the fusion-spliced position A) for the optical fiber transmission line according to the present invention, and FIGS. 1B and 1C are views showing the changes in the Peterman II mode field diameter that occur lengthwise near the fusion-spliced position of the optical fiber transmission line according to the present invention.

Figure 1B:
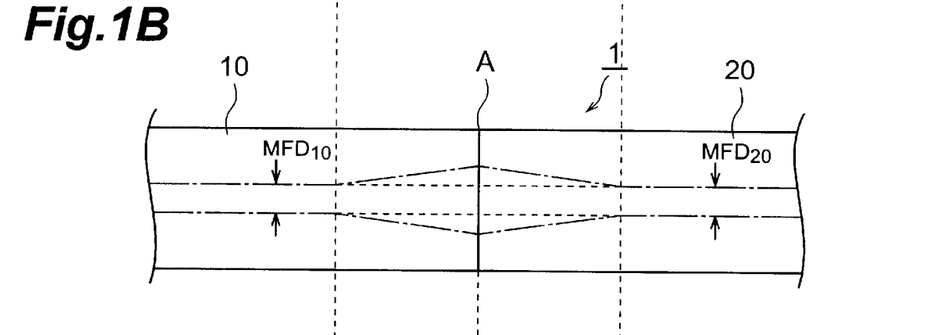
FIGS. 1B and 1C are views showing the changes in the Peterman II mode field diameter near the fusion-spliced position of the optical fiber transmission line according to the present invention.

The optical fiber transmission line 1 is formed by fusion-splicing a first optical fiber 10 and a second optical fiber 20 at the fusion-spliced position A shown in FIG. 1A (comprising the end surfaces of the optical fibers 10 and 20), and by heating the area around the fusion-spliced position A using a heat source 30 (such as a micro-torch or a heater) after fusion-splicing and diffusion of the dopants in the core region (via the dopant diffusion process), the respective mode field diameters of the first and second optical fibers 10 and 20 near the fusion-spliced position A is enlarged in the heated area near the fusion-spliced position A, as shown in FIG. 1B.

$MFD_{10}$ is the minimum mode field diameter of the first optical fiber at the wavelength of 1550 nm, and is the mode field diameter before heating of the first optical fiber 10, or the mode field diameter in the region thereof other than the region heated by the heat source 30. $MFD_{20}$ is the minimum mode field diameter of the second optical fiber at the wavelength of 1550 nm, and is the mode field diameter before heating of the second optical fiber 10, or the mode field diameter in the region thereof other than the region heated by the heat source 30 is excluded. These mode field diameters both refer to the Peterman II mode field diameter at the wavelength of 1550 nm.

Figure 1C:
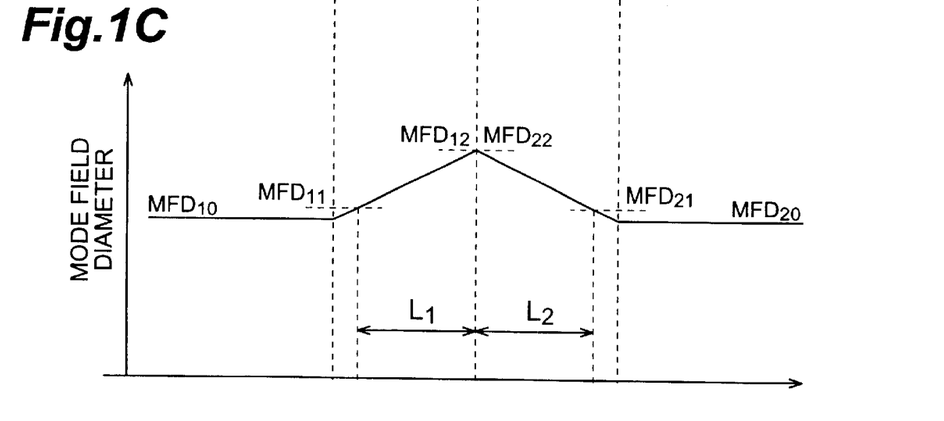

In this optical fiber transmission line 1, the mode field diameter of the first optical fiber 10 and the mode field diameter of the second optical fiber 20 are enlarged in the area surrounding the fusion-spliced position A, as shown in FIG. 1C. $MFD_{12}$ is the mode field diameter of the first optical fiber 10 in the fusion-spliced position A, and $MFD_{22}$ is the mode field diameter of the second optical fiber 20 in the fusion-spliced position A. In the optical fiber transmission line 1, the mode field diameter $MFD_{11}$ of the first optical fiber 10, at a position separated from the fusion-spliced position A by the distance $L_1$, is enlarged 10% beyond the minimum mode field diameter $MFD_{10}$ ($MFD_{11}$ = 1.1×$MFD_{10}$). Similarly, the mode field diameter $MFD_{21}$ of the second optical fiber 20 at a position separated from the fusion-spliced position A by the distance $L_2$ is enlarged 10% beyond the minimum mode field diameter $MFD_{20}$ ($MFD_{21}$ = 1.1×$MFD_{20}$).

The structures of the optical fibers applicable to the optical fiber transmission line according to the first to third embodiments will now be explained.

Figure 2A:
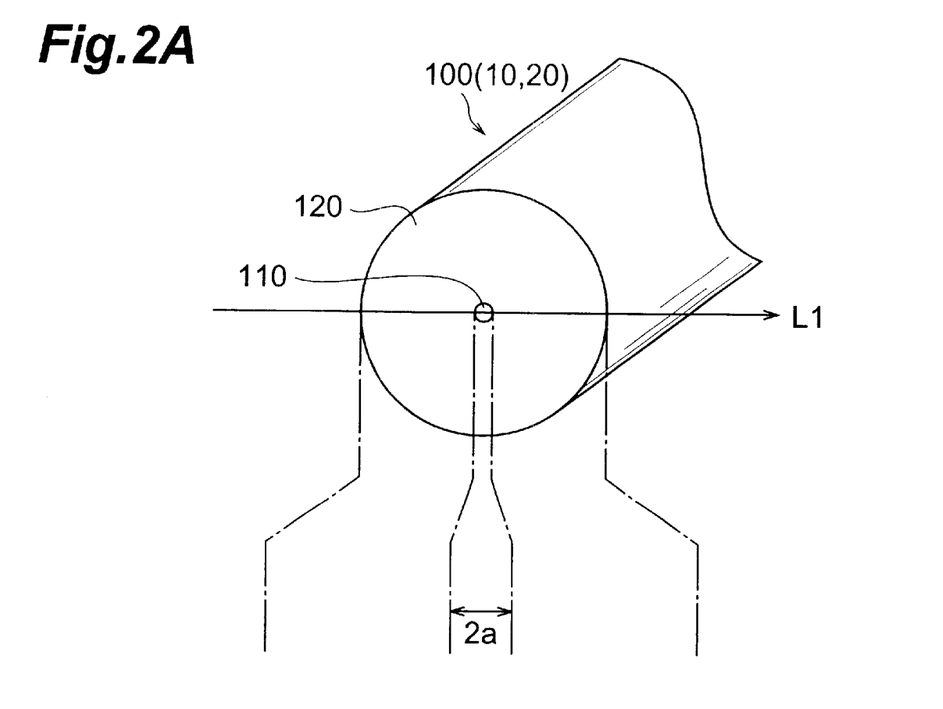
FIGS. 2A and 2B are a cross-sectional view of the optical fiber corresponding to the first and second optical fibers in a first embodiment of the optical fiber transmission line according to the present invention, and a refractive index profile for such optical fibers, respectively.

First, the structure of the optical fiber that can be applied to the optical fiber transmission line according to the first embodiment will be explained with reference to FIGS. 2A and 2B. FIG. 2A is a cross-sectional view of the optical fiber 100 (corresponding to the first and second optical fibers 10 and 20) applied to the first embodiment.

As shown in FIG. 2A, the optical fiber 100 (corresponding to the first and second optical fibers 10 and 20) that comprises the optical fiber transmission line according to the first embodiment comprises a core region 110 extending along the optical axis and having a refractive index of $n_1$ and an outer diameter 2a, and a cladding region 120 provided on the outer periphery of the core region 110 and having a refractive index $n_2$ ($n_1 > n_2$).

Figure 2B:
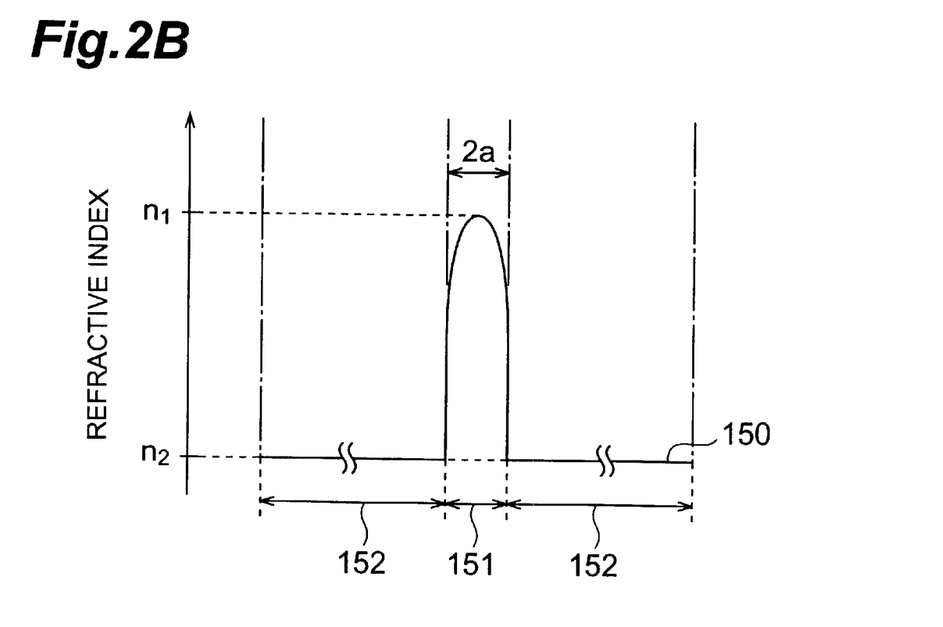

Here, FIG. 2B is a refractive index profile 150 that shows the refractive index at each point along the line L1 that runs across a cross-sectional plane of the optical fiber 100 shown in FIG. 2A cut perpendicular to the optical axis. In this refractive index profile 150, the region 151 shows the refractive index at each part of the core region 110 along the line L1, and the region 152 shows the refractive index at each part of the cladding region 120 along the line L1. The optical fiber transmission line 100 having this refractive index profile 150 is mainly made of silica glass, and is realized by adding Ge to the core region 110. In this refractive index profile 150, the refractive index of the central part of the core region 110 near the optical axis may be smaller than the refractive index of the peripheral part within the core region 110.

Figure 3A:
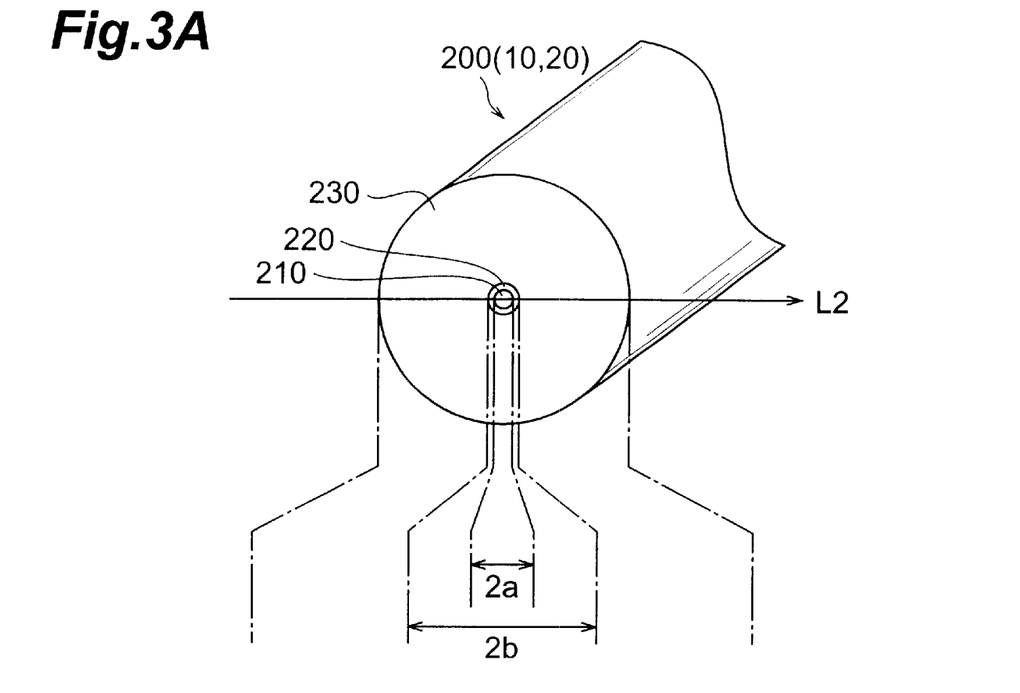
FIGS. 3A and 3B are a cross-sectional view of the optical fiber corresponding to the first and second optical fibers in a second embodiment of the optical fiber transmission line according to the present invention, and a refractive index profile for such optical fibers, respectively.

The optical fiber that is can be applied in the optical fiber transmission line according to the second embodiment has the structure described below. FIG. 3A is a cross-sectional view of the optical fiber 200 (corresponding to the first and second optical fibers 10 and 20) according to the second embodiment.

As shown in FIG. 3A, the optical fiber 200 (corresponding to the first and second optical fibers 10 and 20) comprising the optical fiber transmission line according to the second embodiment comprises a core region 210 extending along the optical axis and having a refractive index $n_1$ and an outer diameter $2a$, a first cladding region 220 provided on the outer periphery of the core region 210 and having a refractive index $n_2$ ($n_2 < n_1$), and a second cladding region 230 provided on the outer periphery of the first cladding region 220 and having a refractive index $n_3$ ($n_2 < n_3 < n_1$).

Figure 3B:
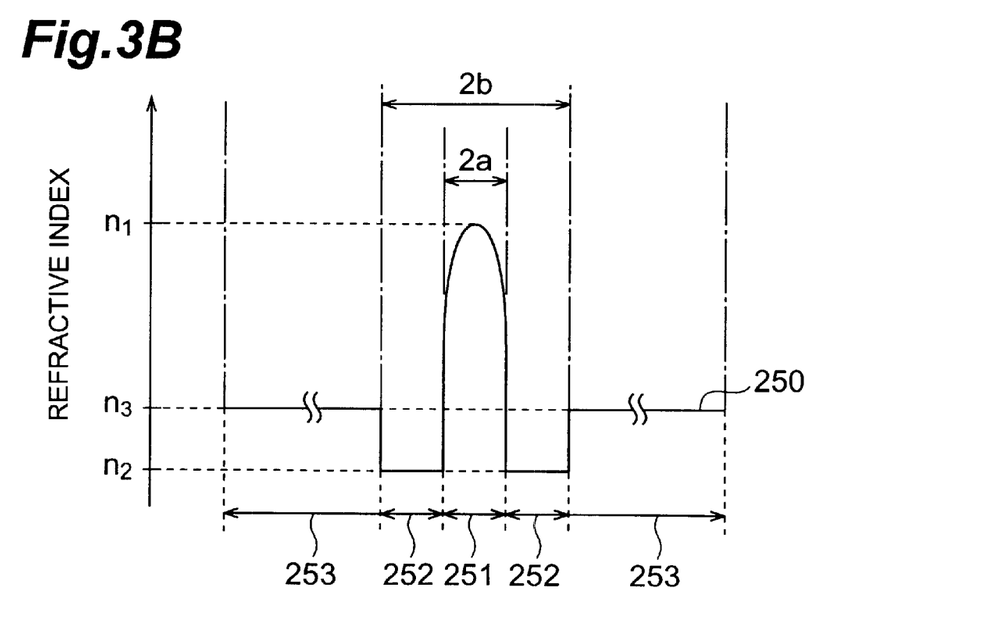

Here, FIG. 3B is a refractive index profile 250 that shows the refractive index at each point along the line L2 that runs across a cross-sectional plane of the optical fiber 200 shown in FIG. 3A cut perpendicular to the optical axis. In this refractive index profile 250, the region 251 shows the refractive index at each part of the core region 210 along the line L2, the region 252 shows the refractive index at each part of the first cladding region 220 along the line L2, and the region 253 shows the refractive index at each part of the second cladding region 230 along the line L2. The optical fiber transmission line 200 having this refractive index profile 250 is mainly made of silica glass, and is realized by adding Ge to the core region 210 and by adding F to the first cladding region 220. In this refractive index profile 250, the refractive index of the central part of the core region 210 near the optical axis may be smaller than the refractive index of the peripheral part of the core region 210.

Figure 4A:
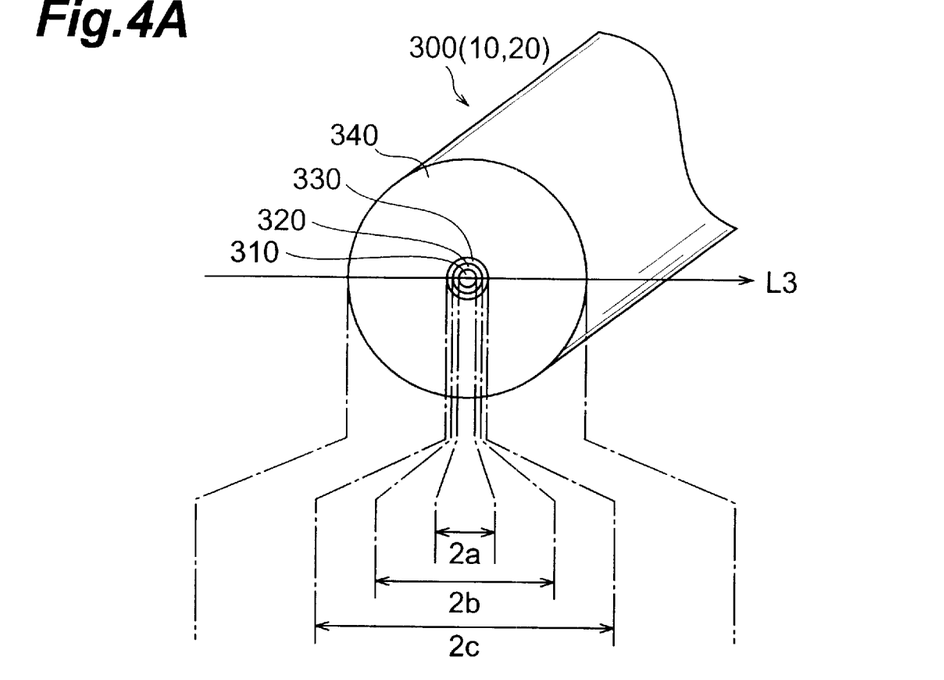
FIGS. 4A and 4B are a cross-sectional view of the optical fiber corresponding to the first and second optical fibers in a third embodiment of the optical fiber transmission line according to the present invention, and a refractive index profile for such optical fibers, respectively.

Furthermore, the optical fiber that can be applied to the optical fiber transmission line according to the third embodiment has the structure described below. FIG. 4A is a cross-sectional view of the optical fiber 300 (corresponding to the first and second optical fibers 10 and 20) according to the third embodiment.

As shown in FIG. 4A, the optical fiber 300 (corresponding to the first and second optical fibers 10 and 20) constituting the optical fiber transmission line according to the third embodiment, comprises a core region 310 extending along the optical axis and having a refractive index $n_1$ and an outer diameter $2a$, a first cladding region 320 provided on the outer periphery of the core region 310 and having a refractive index $n_2$ ($n_2 < n_1$), a second cladding region 330 provided on the outer periphery of the first cladding region 320 and having a refractive index $n_3$ ($n_2 < n_3 < n_1$), and a third cladding region 340 provided on the outer periphery of the second cladding region 330 and having a refractive index $n_4$ ($n_2 < n_4 < n_3$).

Figure 4B:
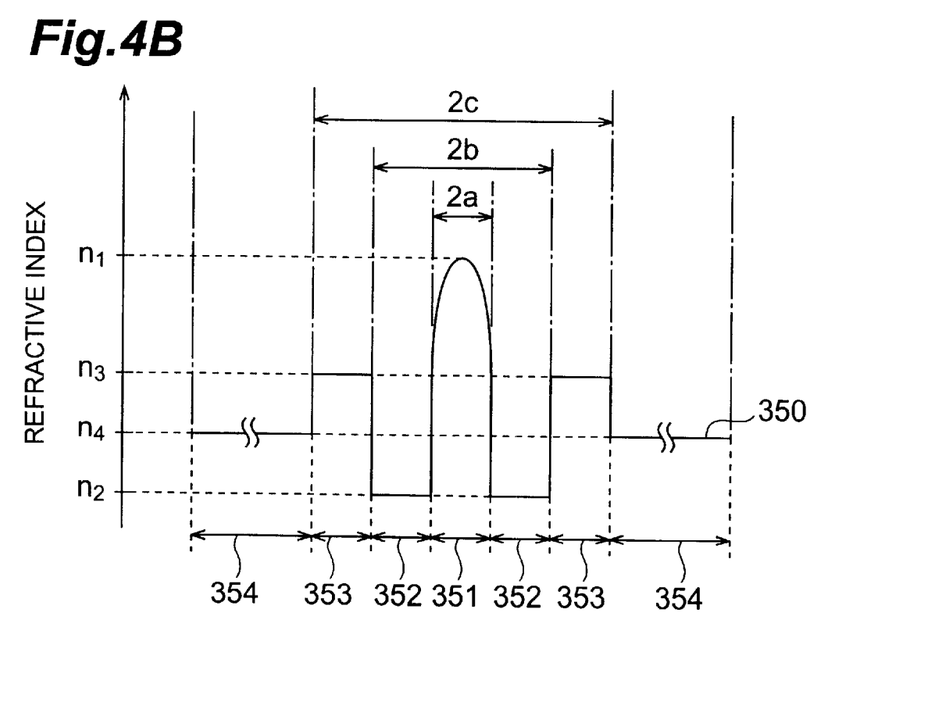

Here, FIG. 4B is a refractive index profile 350 that shows the refractive index at each point along the line L3 that runs across a cross-sectional plane of the optical fiber 300 shown in FIG. 4A cut perpendicular to the optical axis. In this refractive index profile 350, the region 351 shows the refractive index at each part of the core region 310 along the line L3, the region 352 shows the refractive index at each part of the first cladding region 320 along the line L3, the region 353 shows the refractive index at each part of the second cladding region 330 along the line L3, and the region 354 shows the refractive index at each part of the third cladding region 340 along the line L3. The optical fiber transmission line 300 having this refractive index profile 350 is mainly made of silica glass, and is realized by adding Ge to the core region 310 and to the second cladding region 330 and by adding F to the first cladding region 320. In this refractive index profile 350, the refractive index of the central part of the core region 310 near the optical axis may be smaller than the refractive index of the peripheral part of the core region 310.

In the optical fiber transmission line according to the first to third embodiments, the core regions of the first optical fiber 10 and the second optical fiber 20 are doped with 10 mol % of Ge, so that the relative refractive index difference of the core region with respect to of the outermost layer is large. Furthermore, in the optical fiber transmission line according to the first to third embodiments, where the minimum mode field diameter of the first optical fiber 10 at the wavelength of 1550 nm is deemed $MFD_{10}$ and the minimum mode field diameter of the second optical fiber 20 at the wavelength of 1550 nm is deemed $MFD_{20}$, the respective minimum mode field diameters $MFD_{10}$ and $MFD_{20}$ of the optical fibers 10 and 20 are 7 $\mu$m or less, as shown in FIG. 1C. In addition, the absolute value of the difference between the respective minimum mode field diameters of the optical fibers 10 and 20 ($MFD_{10} - MFD_{20}$) is 1 $\mu$m or less.

The characteristics of the first and second optical fibers 10 and 20 at the wavelength of 1550 nm are such that these optical fibers are suitable for use as a dispersion compensating optical fiber having a negative chromatic dispersion and a negative dispersion slope, for example, or as a highly non-linear optical fiber in which non-linear optical events easily occur, such as a Rahman amplification medium. If the first and second optical fibers 10 and 20 used as dispersion compensating optical fibers respectively have, as characteristics at the wavelength of 1550 nm, a chromatic dispersion of −200 ps/nm/km to −80 ps/nm/km and a negative dispersion slope, they are desirable for use in a relay station or similar device after modularization via winding in a coil configuration. If the first optical fiber 10 and the second optical fiber 20 used as dispersion compensating optical fiber respectively have, as characteristics at the wavelength of 1550 nm, a chromatic dispersion of −60 ps/nm/km to −5 ps/nm/km and a negative dispersion slope, they are desirable for use while placed in a relay space.

In the area near the fusion-spliced position A of the optical fiber transmission line 1 (the fusion-spliced position between the first optical fiber 10 and the second optical fiber 20), the distance between the position at which the mode field diameter of the first optical fiber 10 is $MFD_{11}$ ($=1.1 \times MFD_{10}$) and the fusion-spliced position A is deemed $L_1$, as shown in FIG. 1C. Similarly, in the area near the fusion-spliced position A of the optical fiber transmission line 1 the distance between the position at which the mode field diameter of the second optical fiber 20 is $MFD_{21}$ (=1.1× $MFD_{20}$) and the fusion-spliced position A is deemed $L_2$. In the optical fiber transmission line 1, the distances $L_1$ and $L_2$ are set to be at least 2 mm. In other words, in the optical fiber transmission line 1, the mode field diameter at the wavelength of 1550 nm is enlarged within the region 2 mm from the fusion-spliced position A. The fact that the mode field diameters $MFD_{11}$ and $MFD_{21}$ at the positions located at distances $L_1$ and $L_2$ from the fusion-spliced position A, respectively, are 10% or more larger than the minimum mode field diameters $MFD_{10}$ and $MFD_{20}$ means that the mode field diameters in each region that extends over the distances $L_1$ and $L_2$ from the fusion-spliced position A are intentionally enlarged, unlike in other regions, and are to be distinguished from the mere natural variations in mode field diameter that occur during manufacturing of the optical fiber. Using the above structure, because the connection loss at the fusion-spliced position A is small, and the wavelength-dependency regarding this connection loss is reduced, the optical fiber transmission line 1 is suitable for use in long-haul WDM transmission.

It is preferred that the mode field diameter $MFD_{12}$ at the fusion-spliced position A of the first optical fiber 10 be enlarged to a value of 0.5 μm or more larger than the minimum mode field diameter $MFD_{10}$. Similarly, it is preferred that the mode field diameter $MFD_{22}$ at the fusion-spliced position A of the second optical fiber 20 be enlarged to a value of 0.5 μm or more larger than the minimum mode field diameter $MFD_{20}$. In this case, due to the further improved connection loss characteristics, the optical fiber transmission line 1 is even more suitable for use in long-haul WDM transmission. The enlargement of mode field diameter is realized by heating the area around the fusion-spliced position A with a heat source (such as a micro-torch or a heater) during the dopant diffusion process carried out after the fusion-splicing process.

A specific example of the optical fiber transmission line 1 according to the present invention will now be explained together with a comparison example.

Figure 5:
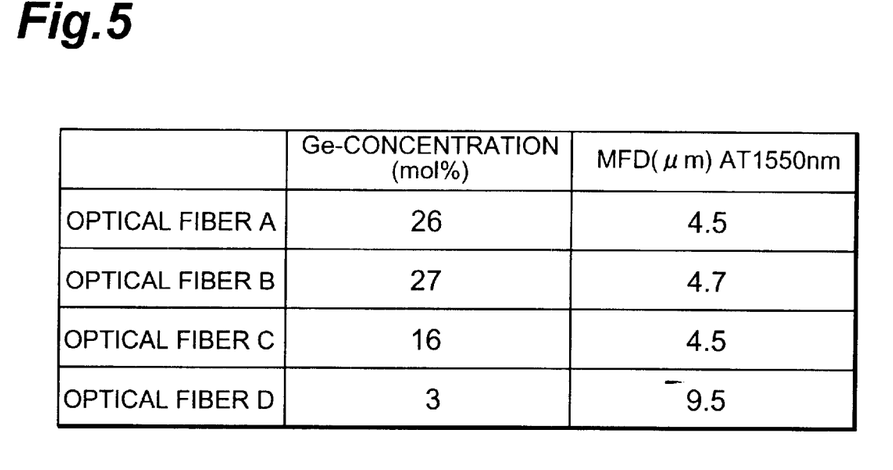
FIG. 5 is a table showing the Ge-concentration and the mode field diameter (MFD) for four types of optical fiber.
Figure 6:
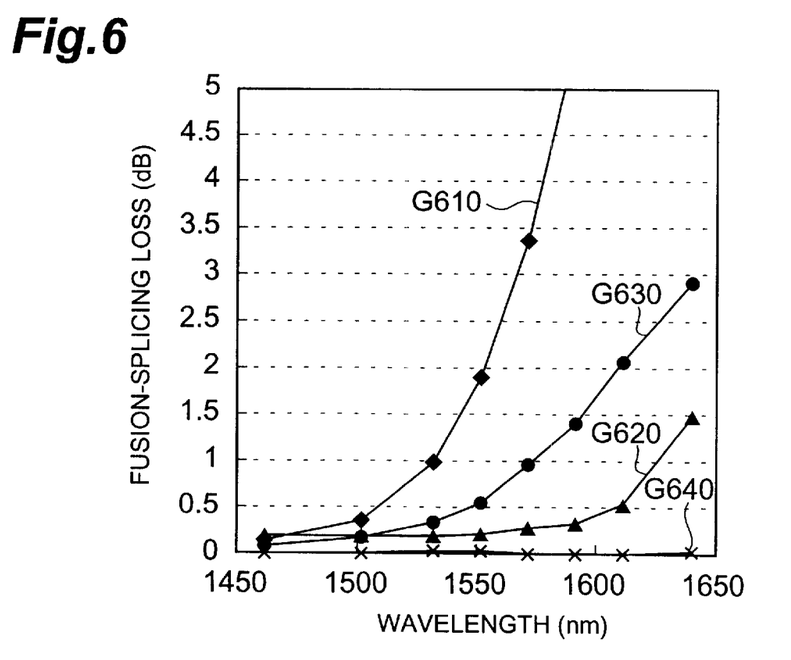
FIG. 6 is a graph showing the connection loss characteristics for the four types of optical fiber shown in FIG. 5 after fusion-splicing but before the dopant diffusion process is performed.

FIG. 5 is a table showing the Ge-concentration and the mode field diameter (MFD) for four types of optical fiber. FIG. 6 is a graph showing the connection loss characteristics for the four types of optical fiber shown in FIG. 5 after fusion-splicing but before the dopant diffusion process is performed.

The optical fiber A has the refractive index profile 350 shown in FIG. 4B, its Ge-concentration in the core region is 26 mol %, and its minimum mode field diameter at the wavelength of 1550 nm is 4.5 μm. The optical fiber B has the refractive index profile 250 shown in FIG. 3B, its Ge-concentration in the core region is 27 mol %, and its minimum mode field diameter at the wavelength of 1550 nm is 4.7 μm. The optical fiber C has the refractive index profile 350 shown in FIG. 4C, its Ge-concentration in the core region is 16 mol %, and its minimum mode field diameter at the wavelength of 1550 nm is 4.5 μm. The optical fiber D has the refractive index profile 150 shown in FIG. 2B, its Ge-concentration in the core region is 3 mol %, and its minimum mode field diameter at the wavelength of 1550 nm is 9.5 μm. The optical fibers A to C are dispersion compensating optical fibers, and the optical fiber D is a standard single-mode optical fiber.

In FIG. 6, the curve G610 indicates the connection loss for an optical fiber transmission line formed by fusion-splicing first and second optical fibers each having the same structure as the optical fiber A, the curve G620 indicates the connection loss for an optical fiber transmission line formed by fusion-splicing first and second optical fibers each having the same structure as the optical fiber B, the curve G630 indicates the connection loss for an optical fiber transmission line formed by fusion-splicing first and second optical fibers each having the same structure as the optical fiber C, and the curve G640 indicates the connection loss for an optical fiber transmission line (the comparison example) formed by fusion-splicing first and second optical fibers each having the same structure as the optical fiber D. As can be seen from FIG. 6, in the case of the optical fiber D having a low Ge-concentration in the core region and a large mode field diameter (curve G640), the connection loss is 0.05 dB or less over a wide wavelength range, i.e., from 1450 nm to 1650 nm. In comparison, in the case of the optical fibers A to C having a high Ge-concentration in the core region and a small mode field diameter (curves G610–G630), the connection loss is greater than in the case of the optical fiber D, and rises as the wavelength increases. When comparing the optical fibers A and C, which have the same refractive index profile and the same mode field diameter, it is seen that the optical fiber A having the higher Ge-concentration has the larger connection loss and the higher wavelength-dependency regarding this connection loss.

These connection loss characteristics are thought to result from the fact that when optical fibers having a high Ge-concentration in the core region and small mode field diameter are fusion-spliced together, the Ge becomes diffused in the area very close to the fusion-spliced position, causing the mode field diameter to be enlarged. In an optical fiber having a small minimum mode field diameter, even a small enlargement in the mode field diameter near the fusion-spliced position causes a sudden change in the mode field diameter in the lengthwise direction. When the mode field diameter in the longitudinal direction changes suddenly in this way, the larger the wavelength, the larger the connection loss becomes in this part. Moreover, because the mode field diameter is small, it is possible that connection loss may occur due to axial offset. It is believed that due to these factors, where the optical fibers A to C are used as the first and second optical fibers, the connection loss is greater than when the optical fiber D is used as the first and second optical fibers, and the connection loss increases as the wavelength increases. Because the optical fiber transmission line 1 is formed by fusion-splicing such optical fibers, adjustments are performed to ensure that changes in the mode field diameter within a certain range including the fusion-spliced position A are gradual.

Figure 7:
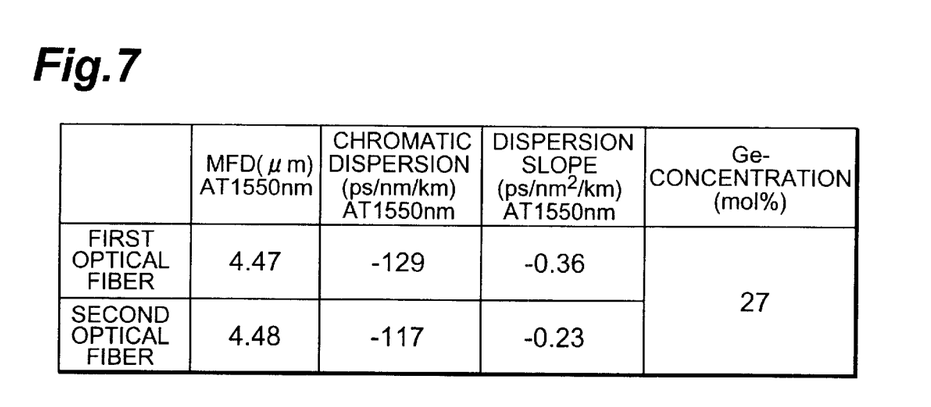
FIG. 7 is a table showing various characteristics of the first and second optical fibers of the optical fiber transmission line according to the first embodiment at the wavelength of 1550 nm for each optical fiber.
Figure 8:
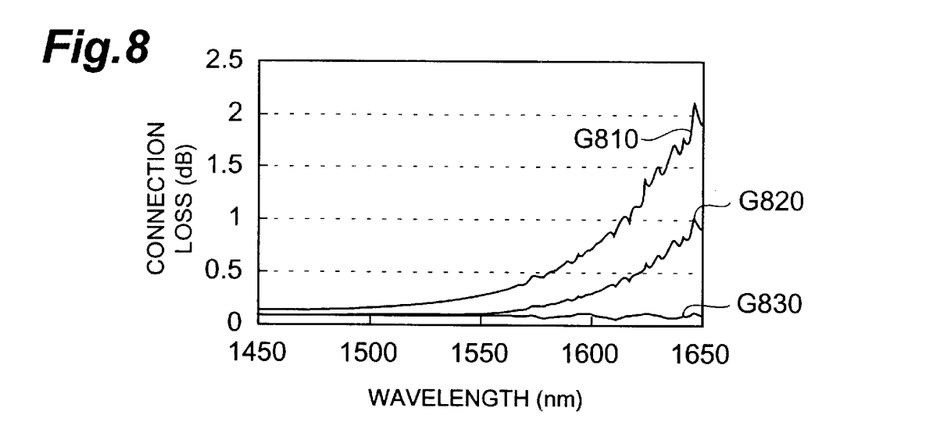
FIG. 8 is a graph showing the connection loss characteristics of the optical fiber transmission line according to the first embodiment.
Figure 9:
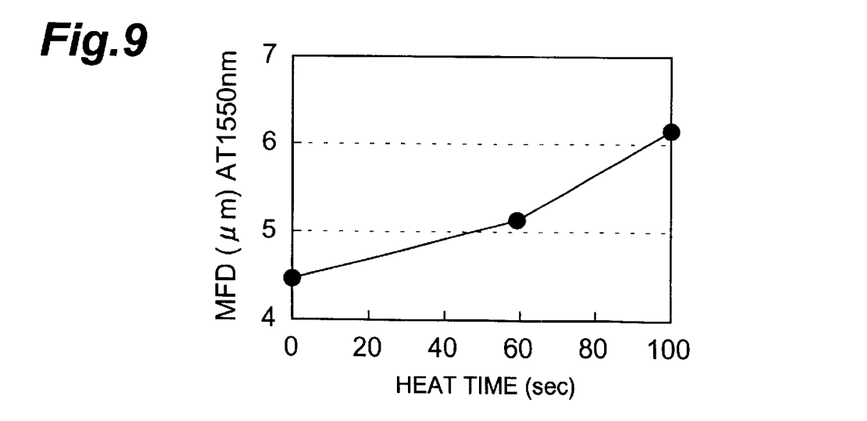
FIG. 9 is a graph showing the relationship between the mode field diameter at the fusion-spliced position between the first and second optical fibers and the heating time, in connection with the optical fiber transmission line according to the first embodiment.

FIGS. 7 to 9 are views to explain the optical fiber transmission line according to the first embodiment. Specifically, FIG. 7 is a table showing various characteristics of the first and second optical fibers of the optical fiber transmission line according to the first embodiment at the wavelength of 1550 nm for each optical fiber. FIG. 8 is a graph showing the connection loss characteristics of the optical fiber transmission line according to the first embodiment, while FIG. 9 is a graph showing the relationship between the mode field diameter at the fusion-spliced position between the first and second optical fibers and the heating time, in connection with the optical fiber transmission line according to the first embodiment.

In the optical fiber transmission line according to the first embodiment, each of the first and second optical fibers has the refractive index profile 250 shown in FIG. 3B. The first optical fiber has, as characteristics at the wavelength of 1550 nm, a minimum mode field diameter $MFD_{10}$ of 4.47 μm, a chromatic dispersion of −129 ps/nm/km, and a dispersion slope of −0.36 ps/nm²/km, and the Ge-concentration in the core region is 27 mol % (see FIG. 7). On the other hand, the second optical fiber has, as characteristics at the wavelength of 1550 nm, a minimum mode field diameter $MFD_{20}$ of 4.48 µm, a chromatic dispersion of −117 ps/nm/km, and a dispersion slope of −0.23 ps/nm²/km, while the Ge-concentration in the core region is also 27 mol % (see FIG. 7).

Furthermore, as seen in FIGS. 8 and 9, in the optical fiber transmission line according to the first embodiment, as the heating time for the dopant diffusion process increased, the mode field diameter at the fusion-spliced position at the wavelength of 1550 nm is enlarged, the connection loss decreased, and the wavelength-dependency regarding this connection loss decreased as well. In other words, before the dopant diffusion process, the mode field diameter at the fusion-spliced position at the wavelength of 1550 nm was 4.5 µm, and the wavelength-dependency of connection loss was large. At a heating time of 60 seconds, the mode field diameter at the fusion-spliced position at the wavelength of 1550 nm is enlarged to 5.1 µm, and the wavelength-dependency of connection loss decreased. At a heating time of 100 seconds, $L_1=L_2=3$ mm resulted, the mode field diameter at the fusion-spliced position at the wavelength of 1550 nm is enlarged to 6.1 µm, and the wavelength-dependency of connection loss decreased further. When the dopant diffusion process was carried out with a heating time of 100 seconds in this fashion after fusion-splicing, the connection loss at 1550 nm declined from 0.24 dB at the moment the fusion process was completed to 0.06 dB, and the connection loss at 1600 nm declined from 0.70 dB at the moment the fusion process was completed to 0.07 dB. In FIG. 8, the curve G810 indicates the wavelength-dependency of connection loss for the optical fiber transmission line having a mode field diameter of 4.5 µm at the fusion-spliced position (heating time: 0 seconds), the curve G820 indicates the wavelength-dependency of connection loss for the optical fiber transmission line in which the mode field diameter at the fusion-spliced position was enlarged to 5.1 µm due to the dopant diffusion process (heating time: 60 seconds), and the curve G830 indicates the wavelength-dependency of connection loss for the optical fiber transmission line in which the mode field diameter at the fusion-spliced position was enlarged to 6.1 µm due to the dopant diffusion process (heating time: 100 seconds).

Figure 10:
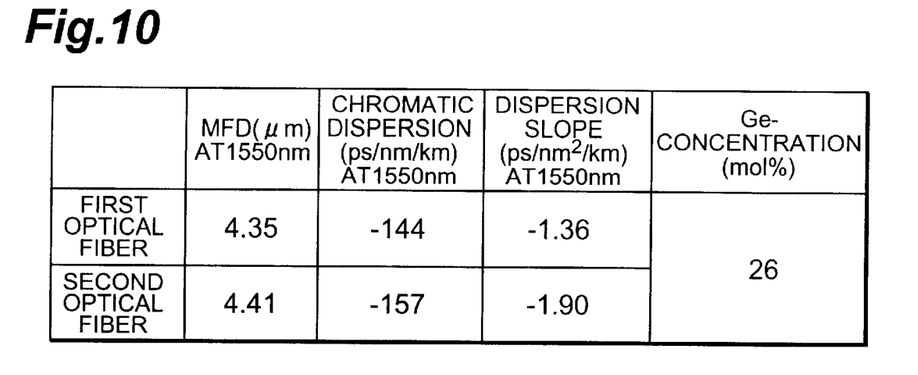
FIG. 10 is a table showing various characteristics of the first and second optical fibers of the optical fiber transmission line according to the second embodiment at the wavelength of 1550 nm for each optical fiber.
Figure 11:
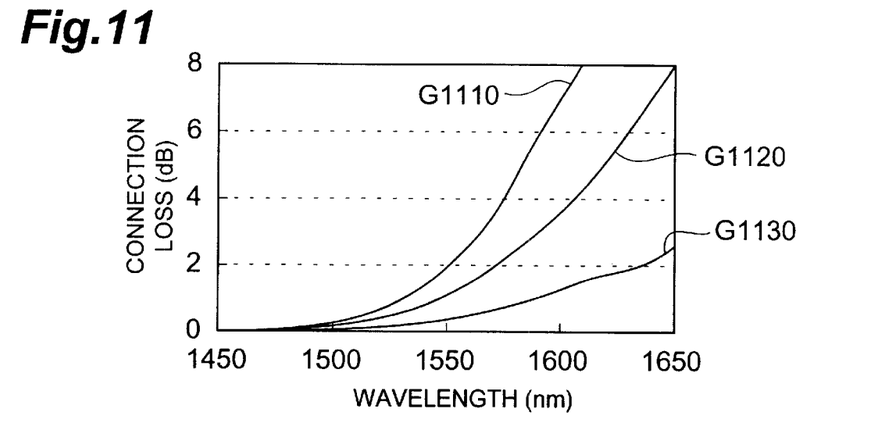
FIG. 11 is a graph showing the connection loss characteristics of the optical fiber transmission line according to the second embodiment.
Figure 12:
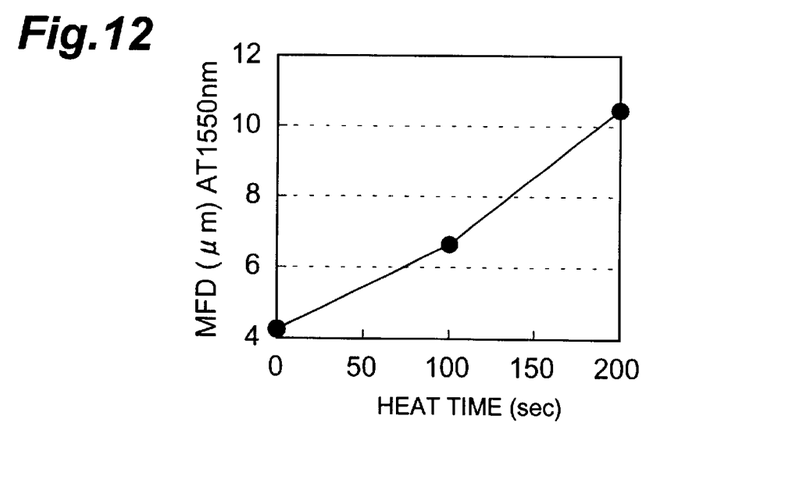
FIG. 12 a graph showing the relationship between the mode field diameter at the fusion-spliced position between the first and second optical fibers and the heating time in connection with the optical fiber transmission line according to the second embodiment.

FIGS. 10 to 12 are views to explain the optical fiber transmission line according to the second embodiment. Specifically, FIG. 10 is a table showing various characteristics of the first and second optical fibers of the optical fiber transmission line according to the second embodiment at the wavelength of 1550 nm for each optical fiber. FIG. 11 is a graph showing the connection loss characteristics of the optical fiber transmission line according to the second embodiment, while FIG. 12 is a graph showing the relationship between the mode field diameter at the fusion-spliced position between the first and second optical fibers and the heating time, in connection with the optical fiber transmission line according to the second embodiment.

In the optical fiber transmission line according to the second embodiment, each of the first and second optical fibers has the refractive index profile 350 shown in FIG. 4B. The first optical fiber has, as characteristics at the wavelength of 1550 nm, a minimum mode field diameter $MFD_{10}$ of 4.35 µm, a chromatic dispersion of −144 ps/nm/km, and a dispersion slope of −1.36 ps/nm²/km, and the Ge-concentration in the core region is 26 mol % (see FIG. 10). On the other hand, the second optical fiber has, as characteristics at the wavelength of 1550 nm, a minimum mode field diameter $MFD_{20}$ of 4.41 µm, a chromatic dispersion of −157 ps/nm/km, and a dispersion slope of −1.90 ps/nm²/km, while the Ge-concentration in the core region is also 26 mol % (see FIG. 10).

Furthermore, as seen in FIGS. 11 and 12, in the optical fiber transmission line according to the second embodiment, as the heating time for the dopant diffusion process increased, the mode field diameter at the fusion-spliced position at the wavelength of 1550 nm is enlarged, the connection loss decreased, and the wavelength-dependency regarding this connection loss decreased as well. In other words, before the dopant diffusion process, the mode field diameter at the fusion-spliced position at the wavelength of 1550 nm was 4.4 µm, and the wavelength-dependency of connection loss was large. At a heating time of 100 seconds, the mode field diameter at the fusion-spliced position at the wavelength of 1550 nm is enlarged to 6.5 µm, and the wavelength-dependency of connection loss decreased. At a heating time of 200 seconds, $L_1=L_2=4$ mm resulted, the mode field diameter at the fusion-spliced position at the wavelength of 1550 nm is enlarged to 10.2 µm, and the wavelength-dependency of connection loss decreased further. When the dopant diffusion process was carried out with a heating time of 200 seconds in this fashion after fusion-splicing, the connection loss at 1550 nm declined from 1.87 dB at the moment that the fusion-splicing was completed to 0.36 dB, and the connection loss at 1600 nm declined from 6.60 dB at the moment that the fusion-splicing was completed to 1.20 dB. In FIG. 11, the curve G1110 indicates the wavelength-dependency of connection loss for the optical fiber transmission line having a mode field diameter of 4.4 µm at the fusion-spliced position (heating time: 0 seconds), the curve G1120 indicates the wavelength-dependency of connection loss for the optical fiber transmission line in which the mode field diameter at the fusion-spliced position was enlarged to 6.5 µm due to the dopant diffusion process (heating time: 100 seconds), and the curve G1130 indicates the wavelength-dependency of connection loss for the optical fiber transmission line in which the mode field diameter at the fusion-spliced position was enlarged to 10.2 µm due to the dopant diffusion process (heating time: 200 seconds).

Figure 13:
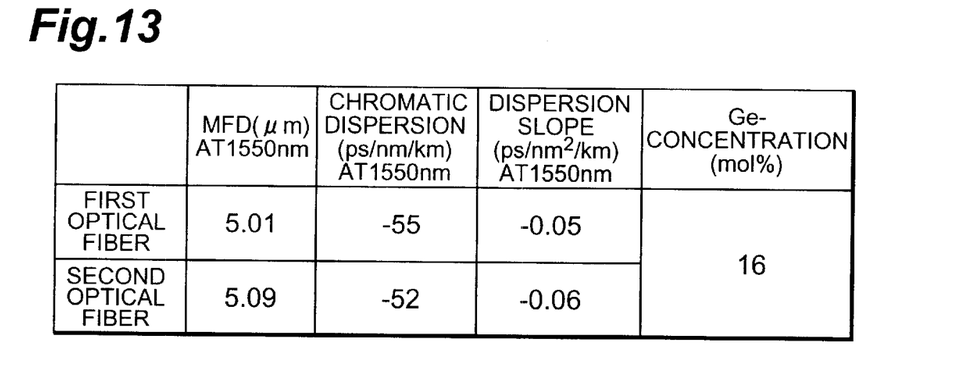
FIG. 13 a table showing various characteristics of the first and second optical fibers of the optical fiber transmission line according to the third embodiment at the wavelength of 1550 nm for each optical fiber.
Figure 14:
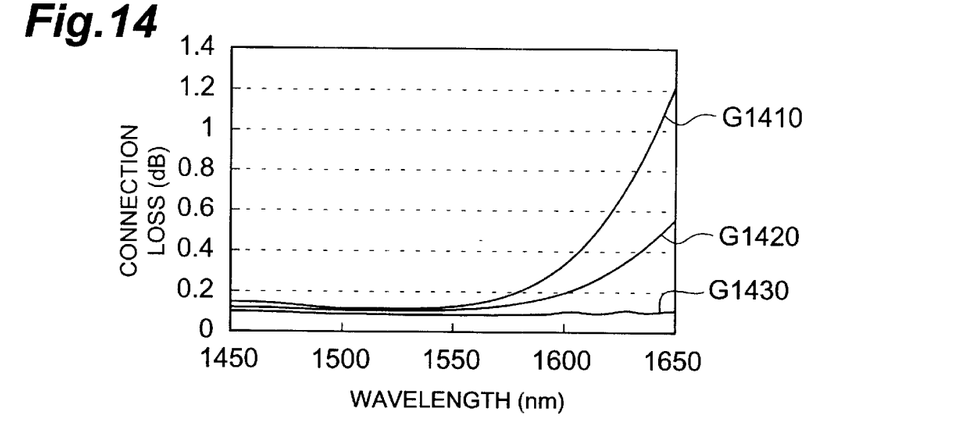
FIG. 14 is a graph showing the connection loss characteristics of the optical fiber transmission line according to the third embodiment.
Figure 15:
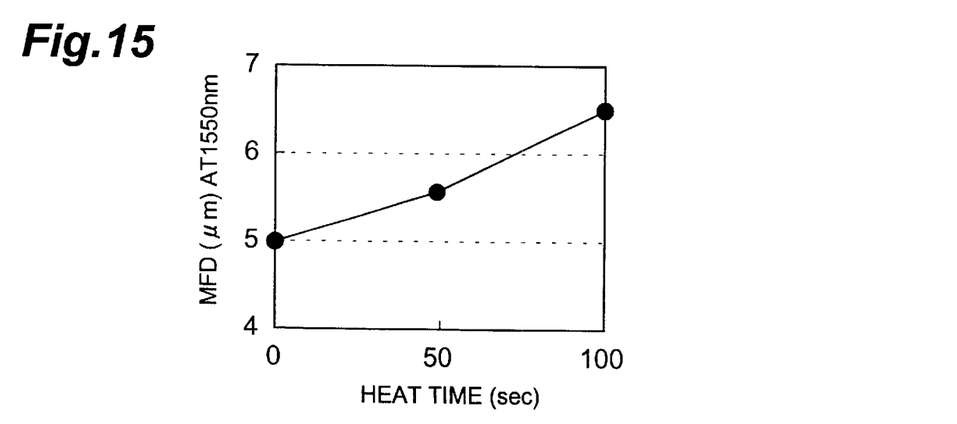
FIG. 15 is a graph showing the relationship between the mode field diameter at the fusion-spliced position between the first and second optical fibers and the heating time in connection with the optical fiber transmission line according to the third embodiment.

FIGS. 13 to 15 are views to explain the optical fiber transmission line according to the third embodiment. Specifically, FIG. 13 is a table showing various characteristics of the first and second optical fibers of the optical fiber transmission line according to the third embodiment at the wavelength of 1550 nm for each optical fiber. FIG. 14 is a graph showing the connection loss characteristics of the optical fiber transmission line according to the third embodiment, while FIG. 15 is a graph showing the relationship between the mode field diameter at the fusion-spliced position between the first and second optical fibers and the heating time, in connection with the optical fiber transmission line according to the third embodiment.

In the optical fiber transmission line according to the third embodiment, each of the first and second optical fibers has the refractive index profile 250 shown in FIG. 3B. The first optical fiber has, as characteristics at the wavelength of 1550 nm, a minimum mode field diameter $MFD_{10}$ of 5.01 µm, a chromatic dispersion of −55 ps/nm/km, and a dispersion slope of −0.05 ps/nm²/km, and the Ge-concentration in the core region is 16 mol % (see FIG. 13). On the other hand, the second optical fiber has, as characteristics at the wavelength of 1550 nm, a minimum mode field diameter $MFD_{20}$ of 5.09 µm, a chromatic dispersion of −52 ps/nm/km, and a dispersion slope of −0.06 ps/nm$^2$/km, while the Ge-concentration in the core region is also 16 mol % (see FIG. 13).

As seen in FIGS. 14 and 15, in the optical fiber transmission line according to the third embodiment, as the heating time for the dopant diffusion process increased, the mode field diameter at the fusion-spliced position at the wavelength of 1550 nm is enlarged, the connection loss decreased, and the wavelength-dependency regarding this connection loss decreased as well. In other words, before the dopant diffusion process, the mode field diameter at the fusion-spliced position at the wavelength of 1550 nm was 5.0 μm, and the wavelength-dependency of connection loss was large. At a heating time of 50 seconds, the mode field diameter at the fusion-spliced position at the wavelength of 1550 nm is enlarged to 5.6 μm, and the wavelength-dependency of connection loss decreased. At a heating time of 100 seconds, $L_1=L_2=3$ mm resulted, the mode field diameter at the fusion-spliced position at the wavelength of 1550 nm is enlarged to 6.5 μm, and the wavelength-dependency of connection loss decreased further. When the dopant diffusion process was carried out with a heating time of 100 seconds in this fashion after fusion-splicing, the connection loss at 1550 nm declined from 1.12 dB at the moment that the fusion-splicing was completed to 0.08 dB, and the connection loss at 1600 nm declined from 0.30 dB at the moment that the fusion-splicing was completed to 0.08 dB. In FIG. 14, the curve G1410 indicates the wavelength-dependency of connection loss for the optical fiber transmission line having a mode field diameter of 5.0 μm at the fusion-spliced position (heating time: 0 seconds), the curve G1420 indicates the wavelength-dependency of connection loss for the optical fiber transmission line in which the mode field diameter at the fusion-spliced position was enlarged to 5.6 μm due to the dopant diffusion process (heating time: 50 seconds), and the curve G1430 indicates the wavelength-dependency of connection loss for the optical fiber transmission line in which the mode field diameter at the fusion-spliced position was enlarged to 6.5 μm due to the dopant diffusion process (heating time: 100 seconds).

Figure 16A:
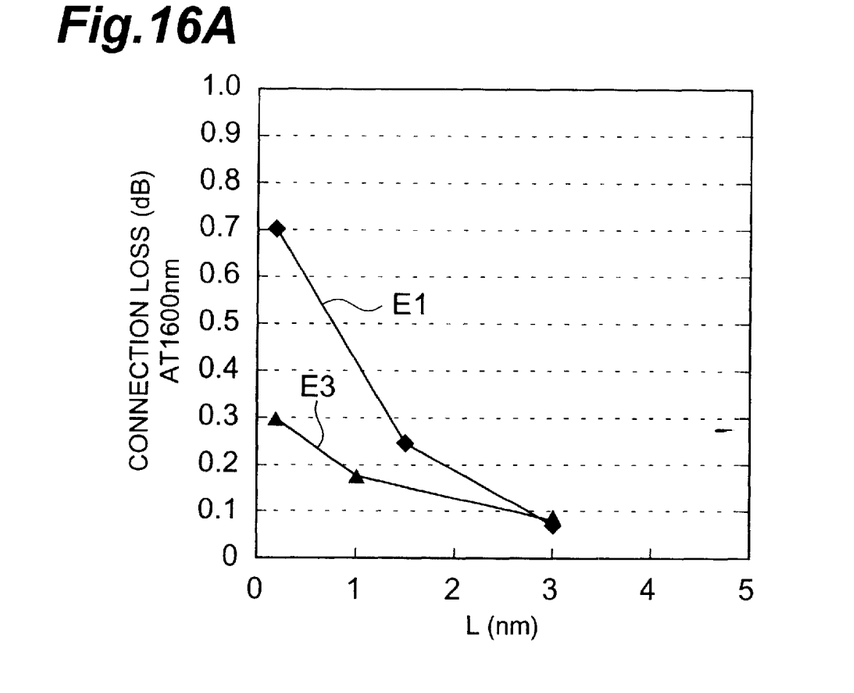
FIGS. 16A and 16B are graphs showing the relationship between the connection loss at the wavelength of 1600 nm and the distance L from the fusion-spliced position for the optical fiber transmission lines according to the first to third embodiments, respectively.
Figure 16B:
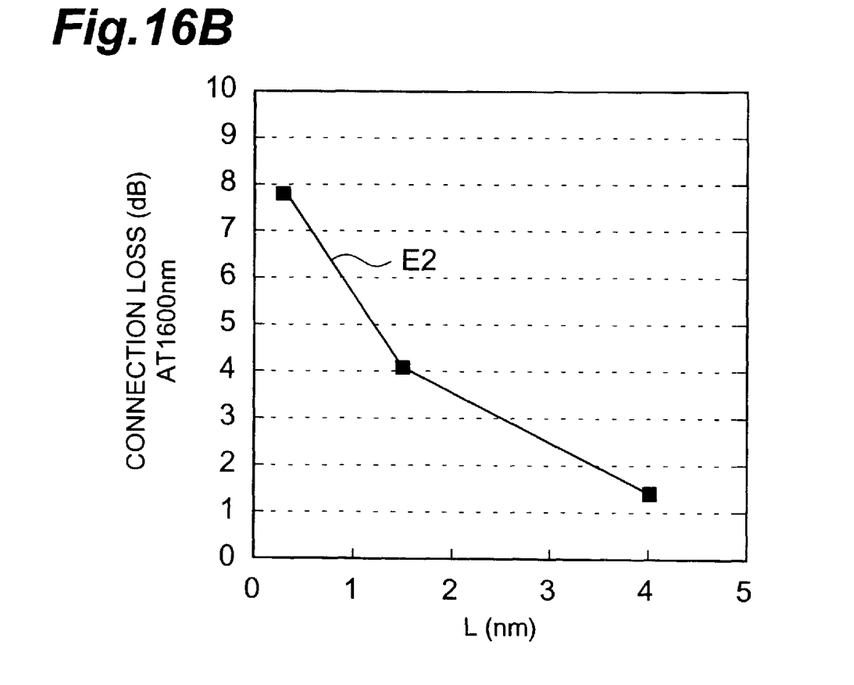

FIGS. 16A and 16B are graphs showing the relationship between the connection loss and the distance L at a wavelength of 1600 nm in connection with the optical fiber transmission line according to the first to third embodiments. Specifically, FIG. 16A shows the distance characteristic of the connection loss for the optical fiber transmission line according to the first and third embodiments (curves E1 and E3), and FIG. 16B shows the distance characteristic of the connection loss for the optical fiber transmission line according to the second embodiment (curve E2). In FIGS. 16A and 16B, the horizontal axis L represents the respective distances $L_1$ and $L_2$ from the fusion-spliced position A, as shown in FIG. 1C.

As is seen from FIGS. 16A and 16B, the distances $L_1$ and $L_2$ after the fusion-splicing process is performed are 0.5 mm or less. As a result of the dopant diffusion process, the distances $L_1$ and $L_2$ lengthen, and the connection loss of the optical fiber transmission line at the wavelength of 1600 nm decreases. If the distances $L_1$ and $L_2$ become 2 mm or greater due to the dopant diffusion process, the connection loss of the optical fiber transmission line at the wavelength of 1600 nm decreases to a value no greater than one-half of the connection loss immediately after fusion-splicing. The longitudinal distribution of the mode field diameter within a certain range including the fusion-spliced position can be observed through the use of a phase-difference microscope or similar apparatus.

As described above, in accordance with the present invention, in the area surrounding the fusion-spliced position between the first and second optical fibers each having a small mode field difference therebetween, changes in each mode field diameter can be appropriately controlled. In particular, each of the first and second optical fibers, which are fusion-spliced to form the optical fiber transmission line, has a core region doped with 10 mol % or more of Ge and Peterman II mode field diameter with a minimum value of 7 μm or less at the wavelength of 1550 nm, and the difference between the respective minimum mode field diameters of the first and second optical fibers is 1 μm or less. In the conventional optical fiber transmission line formed by fusion-splicing such first and second optical fibers, both the connection loss and the wavelength-dependency of connection loss are large. However, in the optical fiber transmission line according to the present invention, the connection loss and the wavelength-dependency of connection loss are decreased by enlarging the mode field diameter at a position located at least 2 mm from the fusion-spliced position to a value of 10% or more larger than the minimum mode field diameter. It is preferred that the enlargement amount of mode field diameter at the fusion-spliced position be 0.5 μm or more for both the first and second optical fibers, and in this case, the connection loss and the wavelength-dependency of connection loss are further reduced.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical fiber transmission line comprising:
    a first optical fiber having a core region doped with a 10 mol % or more of Ge and the Peterman II mode field diameter with a first minimum value of 7 μm or less at a wavelength of 1550 nm; and
    a second optical fiber having one end fusion-spliced to that of said first optical fiber, said second optical fiber having a core region doped with 10 mol % or more of Ge and the Peterman II mode field diameter with a second minimum value of 7 μm or less at the wavelength of 1550 nm, a difference between the first and second minimum values being 1 μm or less;
    wherein the Peterman II mode field diameter of said first optical fiber, at a position separated by at least 2 mm from a fusion-spliced position between said first and second optical fibers, is enlarged so as to reach a value of 110% or more of the first minimum value, and the Peterman II mode field diameter of said second optical fiber, at a position separated by at least 2 mm from said fusion-spliced position between said first and second optical fibers, is enlarged so as to reach a value of 110% or more of the second minimum value.

2. An optical fiber transmission line according to claim 1, wherein the Peterman II mode field diameter of said first optical fiber at said fusion-spliced position is enlarged by 0.5 μm or more in comparison with the first minimum value, and
    wherein the Peterman II mode field diameter of said second optical fiber at said fusion-spliced position is enlarged by 0.5 μm or more in comparison with the second minimum value.

3. An optical fiber transmission line according to claim 1, wherein the Peterman II mode field diameter in each region of said first optical fiber and said second optical fiber that extends 2 mm from said fusion-spliced position is enlarged by heating.

4. An optical fiber transmission line according to claim 1, wherein each of said first and second optical fibers comprises:
   a core region extending along a predetermined axis and having a first refraction index;
   a first cladding region provided on an outer periphery of said core region and having a second refractive index lower than the first refractive index; and
   a second cladding region provided on an outer periphery of said first cladding region and having a third refractive index higher than the second refractive index.

5. An optical fiber transmission line according to claim 1, wherein each of said first and second optical fibers comprises:
   a core region extending along a predetermined axis and having a first refractive index;
   a first cladding region provided on an outer periphery of said core region and having a second refractive index lower than the first refractive index;
   a second cladding region provided on an outer periphery of said first cladding region and having a third refractive index higher than the second refractive index; and
   a third cladding region provided on an outer periphery of said second cladding region and having a fourth refractive index lower than the third refractive index.

6. An optical fiber transmission line according to claim 1, wherein each of said first and second optical fibers has, as characteristics at the wavelength of 1550 nm, a chromatic dispersion of −200 ps/nm/km to −80 ps/nm/km and a negative dispersion slope.

7. An optical fiber transmission line according to claim 1, wherein each of said first and second optical fibers has, as characteristics at the wavelength of 1550 nm, a chromatic dispersion of −60 ps/nm/km to −5 ps/nm/km and a negative dispersion slope.

* * * * *